United States Patent [19]

Nagahisa et al.

[11] Patent Number: 5,173,889
[45] Date of Patent: Dec. 22, 1992

[54] MULTI-LOADED DISK DRIVE ARRANGEMENT

[75] Inventors: Junichi Nagahisa, Zama; Kengo Adachi; Yasukazu Yomogita, both of Sagamihara, all of Japan

[73] Assignee: Victor Company of Japan, Ltd., Yokohama, Japan

[21] Appl. No.: 692,394

[22] Filed: Apr. 25, 1991

[30] Foreign Application Priority Data

Apr. 25, 1990 [JP] Japan ................................ 2-109688

[51] Int. Cl.$^5$ ...................... G11B 17/22; G11B 17/04; G11B 17/08; G11B 15/68
[52] U.S. Cl. .................................... 369/37; 369/178; 360/92; 360/98.04; 360/98.06; 360/98.07
[58] Field of Search .................. 369/37, 178, 192, 270, 369/33, 290, 261; 360/92, 98.01, 98.04, 98.06, 98.07, 98.08

[56] References Cited

U.S. PATENT DOCUMENTS

| | | | |
|---|---|---|---|
| 3,836,154 | 9/1974 | Ishikawa | 360/92 |
| 4,750,160 | 6/1988 | Miller et al. | 369/37 |
| 4,755,978 | 7/1988 | Takizawa | 369/37 |
| 4,823,332 | 4/1989 | Koike | 369/37 |
| 4,901,172 | 2/1990 | Nakazawa et al. | 369/37 |

FOREIGN PATENT DOCUMENTS

| | | |
|---|---|---|
| 62-239375 | 4/1986 | Japan . |
| 62-289960 | 6/1986 | Japan . |

*Primary Examiner*—John W. Shepperd
*Assistant Examiner*—Michael Kessell
*Attorney, Agent, or Firm*—Fleit, Jacobson, Cohn, Price, Holman & Stern

[57] ABSTRACT

A multi-loaded disk drive arrangement comprises a disk table for holding a plurality of disks arranged on the same circumference thereof, a loading mechanism for rotating the table to move a desired disk so that it is placed at a desired position, and a movement mechanism for moving an optical pick-up located below the table so that it is placed at a predetermined position and a single drive source. This arrangement further comprises a reduction mechanism connecting the loading mechanism and the movement mechanism, a cam wheel for moving upward and downward the optical pick-up by the cam surface formed in an inclined manner on the outer circumferential surface, and a clutch mechanism including an idler adapted to rotate when the idler comes into contact with an inner toothed gear of the disk table, wherein when the idler is located at the position of the toothless portion of the loading mechanism, the idler comes into contact with the inner toothed gear by the drive motor to rotate the disk table in a clockwise direction or in a counterclockwise direction, while when the idler is meshed with the toothless portion, the cam wheel connected to the idler is driven to move the recording/reproducing unit so that it is placed at a recording/reproducing position to stop the drive source.

7 Claims, 16 Drawing Sheets

FIG. I PRIOR ART

MULTI-LOADED DISK DRIVE ARRANGEMENT

BACKGROUND OF THE INVENTION

This invention relates to a multi-loaded disk drive arrangement, which is adapted to mount a plurality of disks on a disk-shaped disk table to rotate this disk table in a clockwise direction or in a counterclockwise direction to move a desired disk on the disk table up to a recording/reproducing position to record/reproduce that disk by means of a disk recording/reproducing unit provided with an optical pick-up.

As the disk for recording/reproducing various information such as music or image, etc., optical disks, photomagnetic disks, and the like are widely used in recent years.

There have been proposed multi-loaded disk drive arrangements in which a plurality of such disks are loaded. As an example of these multi-loaded disk drive arrangements, an apparatus in which a plurality of disks are mounted on a disk-shaped disk table to rotate the disk table so that it is located at a predetermined reproducing position to select a desired disk is disclosed in the Japanese Patent Application Laid Open No. 289960/87.

In FIG. 1, disks 101 used in this driving multi-loaded disk arrangement designated by reference numeral 100 (hereinafter simply also referred to as disk drive 100) are, e.g., compact disks for music, or video disks for image, etc.

This disk drive 100 is of a structure described below. Namely, a plurality of disks 101 (e.g., five disks) can be mounted on disk mount portions 103A to 103E of a disk-shaped disk table 103 within a tray 102. A motor 104 for moving the tray 102 is driven to insert the tray 102 into the disk drive through a reduction mechanism section 105 and a rack 106. Then, a gear 107 fixed on the shaft of a motor 104 and meshed with a gear 103a provided on the outer circumference of the disk table 103 is rotationally driven to rotate the disk table 103, thus to move a desired disk 101 on the disk table 103 up to a reproducing position Prl at the upper part of the figure. When the desired disk 101 is thus selected, the motor 104 is rotationally driven for a second time to raise or elevate a vertically movable base (not shown) through a pin 108 by a cam gear 105a of the reduction mechanism section 105 to set a disk reproducing section 109 so that it is in a reproducible state. In this state, the desired disk 101 is mounted on a turn table 110 of the disk reproducing section 109. Thus, this disk can be reproduced by an optical pick-up 111.

In addition, there have been also proposed of multi-loaded disk drives of another type adapted so that a plurality of disks are mounted on a disk-shaped disk table. Some disk drives of this type include a gear for rotating the disk table, a cam for rotating the disk reproducing section so that it is located at a predetermined reproducing position, and a clutch mechanism reciprocating between the gear and the cam and connected to a drive source. In this case, the clutch mechanism is of a structure such that the direction of rotation thereof in the case of rotating the disk table so that it is located at a predetermined reproducing position and that in the case of rotating the disk reproducing section so that it is located at a predetermined reproducing position are different from each other.

Meanwhile, in the case of the conventional multi-loaded disk drive arrangement 100 as shown in FIG. 1 (as previously described), the drive source for rotating the disk table 103 and the drive source for vertically moving the disk reproducing section 109 are different. Accordingly, such disk drive has the problem that the operation for controlling these drive sources is complicated, with the result that an erroneous operation is apt to occur, and the structure is complicated, etc.

On the other hand, in the case of the multi-loaded disk drive arrangement of another type (not shown), as previously described, the direction of rotation for rotating the disk table is always fixed by the operation of the clutch mechanism. For this reason, there is the problem that when selecting a desired disk on the disk table, it takes much time for moving a disk remotest from the reproducing position up to the reproducing position.

SUMMARY OF THE INVENTION

In order to solve the above-mentioned problems, this invention has been made, and its object is to provide a disk drive arrangement allowing the drive source to be controllable by a simple and precise control operation, and capable of immediately carrying out movement of the disk at the reproducing time irrespective of whether or not the accommodating position of the disk is far from the reproducing position.

To achieve the above-mentioned object, as a first aspect, a multi-loaded disk drive arrangement according to this invention comprises a disk table where a plurality of disks on the same circumference thereof, a loading mechanism for rotating a desired disk on the disk table in a clockwise direction or in a counterclockwise direction so that it is located at a predetermined recording/reproducing position, and a movement mechanism for moving a disk recording/reproducing unit including an optical pick-up arranged at a predetermined position below the disk table so that it is placed in a recordable/reproducible state, wherein the loading mechanism and the movement mechanism are connected through a single drive source and a reduction mechanism, the arrangement comprising an idler connected through a clutch mechanism to a planetary gear rotating between a gear of the final stage of the reduction mechanism and a toothed gear including a toothless portion formed annular, and a cam wheel rotatably connected to the idler through the clutch mechanism, and including a disk recording/reproducing unit vertically moving cam for moving the disk recording/reproducing unit, wherein when the idler is located at the position of the toothed portion, the drive source is driven to thereby allow the idler to come into contact with the disk table to rotate the disk table in a clockwise direction or in a counterclockwise direction, while when the idler is meshed with the toothed gear, the cam wheel connected to the idler is driven to move the disk recording/reproducing unit so that it is placed at the recording/reproducing position, and to stop the drive source.

Further, as a second aspect, the cam wheel provided in the multi-loaded disk drive arrangement according to this invention includes a cam mode detecting cam for operating a mode detector for controlling the drive source, and a lock cam for locking the disk table when the disk recording/reproducing unit is in a recordable/reproducible state.

As described above, in the first aspect, the multi-loaded disk drive arrangement according to this invention is such that the loading mechanism for rotating a desired disk on the disk table in a clockwise direction or in a counterclockwise direction so that it is placed at a predetermined recording/reproducing position, and the movement mechanism for vertically moving the disk recording/reproducing unit are connected to a single drive source through the clutch mechanism. Within this arrangement, they are in one body in appearance. As a result, there is no necessity of using a plurality of drive sources as in the prior art, and the number of parts is reduced to much extent. Thus, this multi-loaded disk drive arrangement greately contributes to reduction in the manufacturing cost. Further, since the disk table can be rotated in a clockwise direction or in a counterclockwise direction at the time of selecting a desired disk, it is possible to quickly move a desired disk up to a predetermined recording/reproducing position, advantageously resulting in improvement in the operability in loading disks.

In the second aspect, since, in addition to the disk recording/reproducing unit vertically moving cam, a cam mode detecting cam for operating the cam mode detector for controlling the drive source and the lock cam for locking the disk table when the disk recording-/reproducing unit is in a recordable/reproducible state are formed, the quality and the reliability of the multi-loaded disk drive arrangement are advantageously considerably improved.

DETAILED DESCRIPTION OF THE PREFERRED EMBODIMENTS

An embodiment of a multi-loaded disk drive arrangement according to this invention will now be described in detail with reference to FIGS. 2 to 11.

Figure 1:
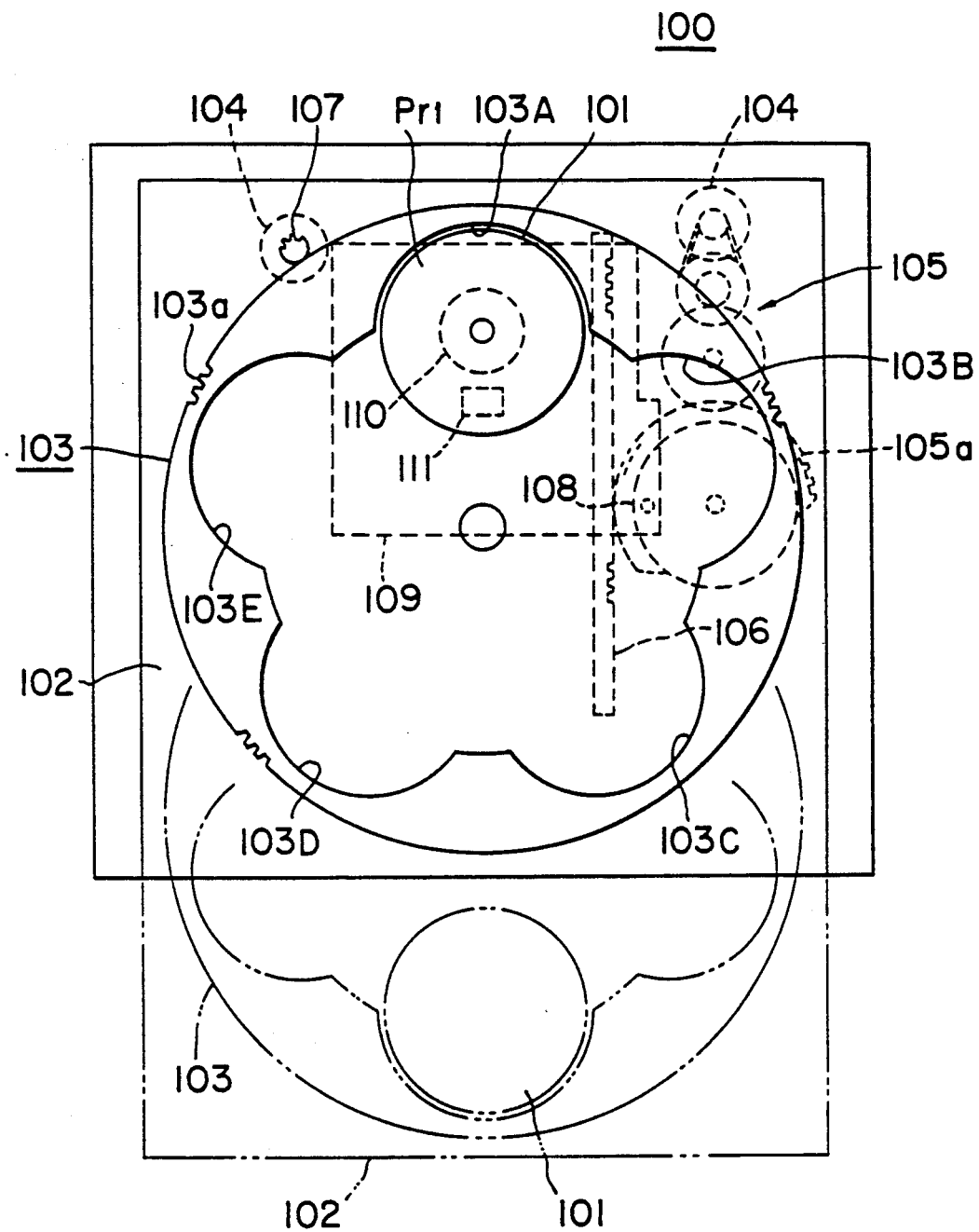
FIG. 1 is a view showing the outline of the configuration of a conventional multi-loaded disk drive arrangement.
Figure 2:
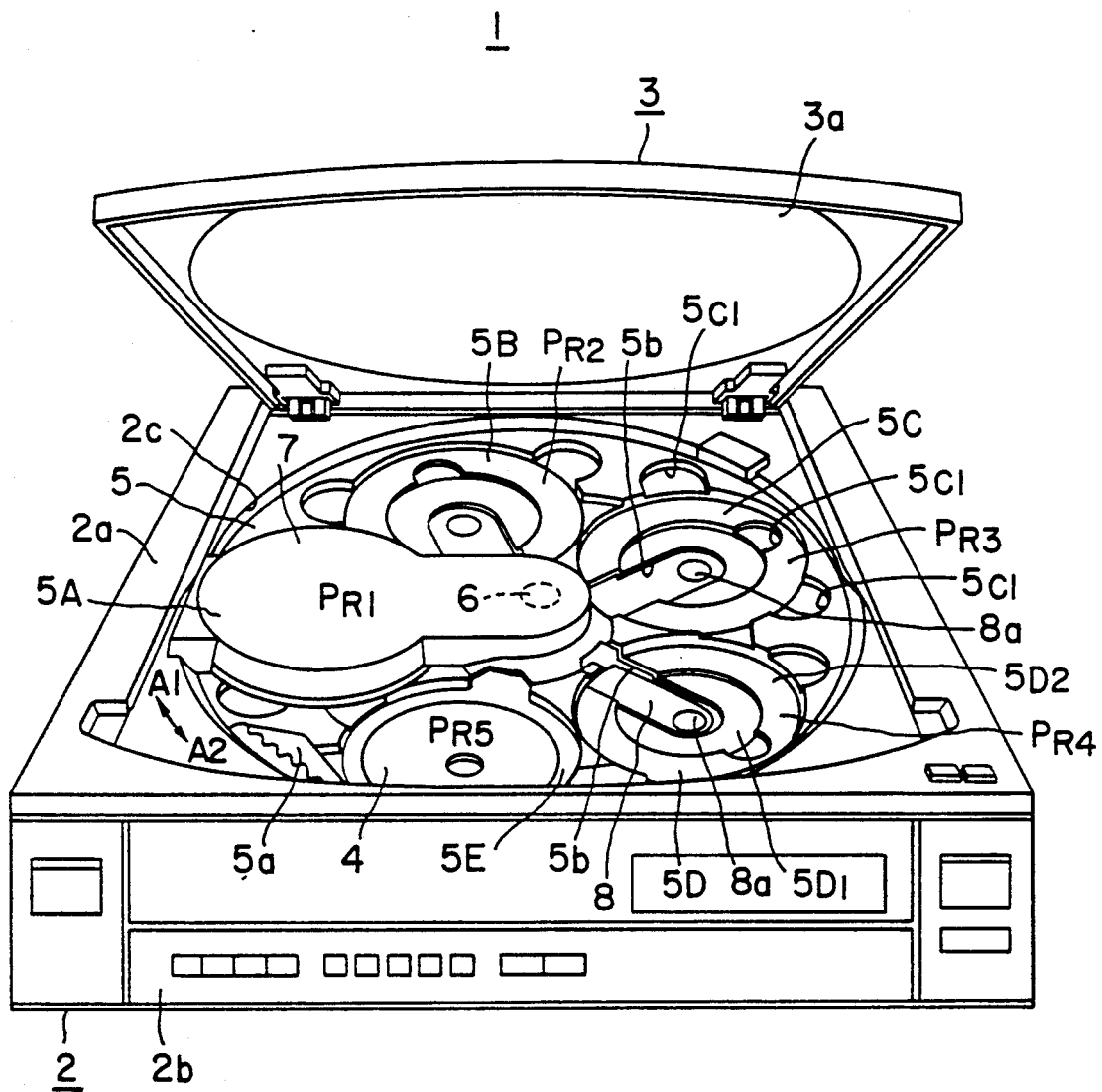
FIG. 2 is a perspective view showing the outside appearance of a multi-loaded disk drive arrangement according to an embodiment of this invention.
Figure 3:
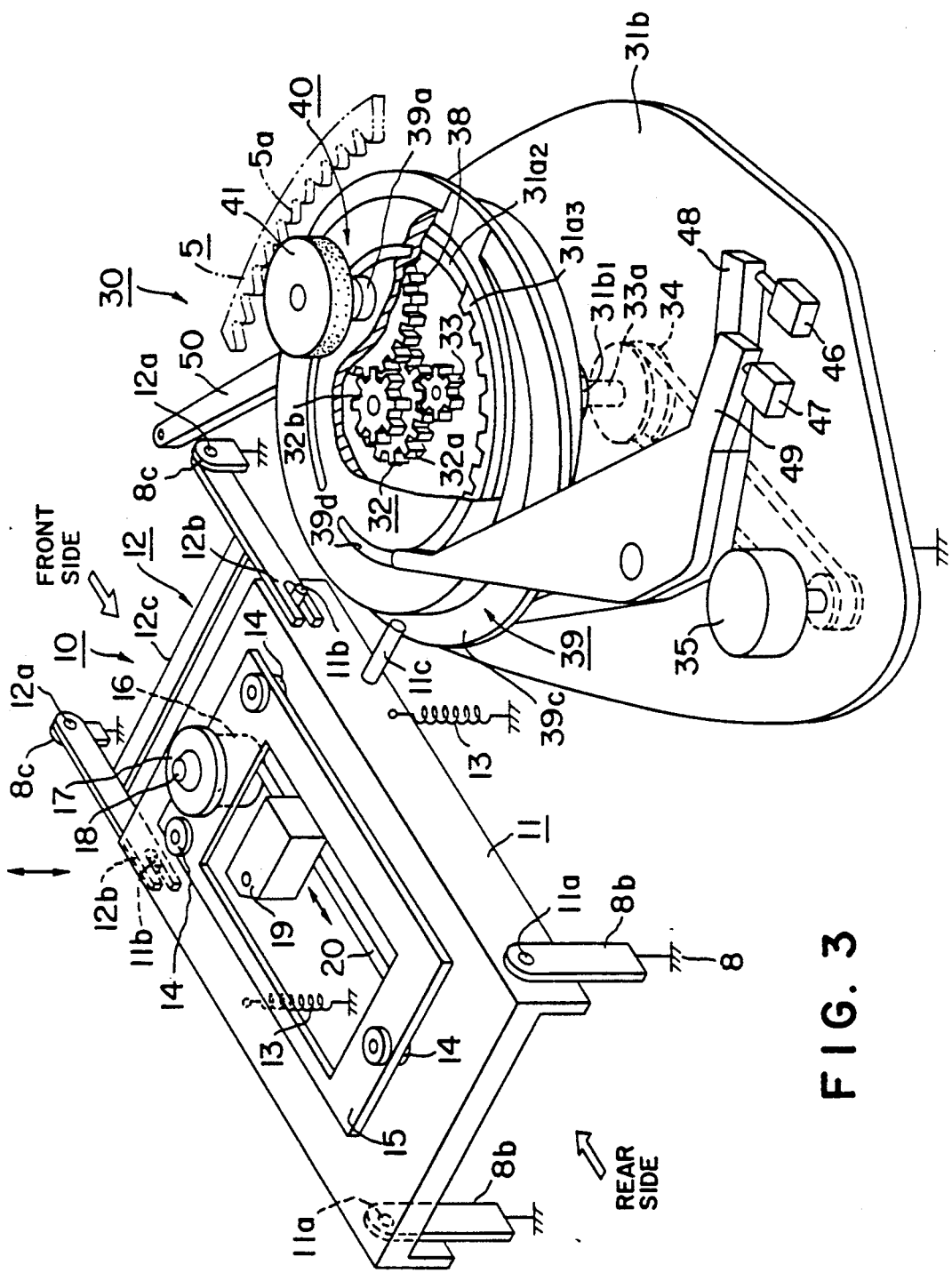
FIG. 3 is a perspective view showing the disk recording/reproducing unit and the loading mechanism unit which serve as the essential part of the embodiment of this invention.
Figure 4A:
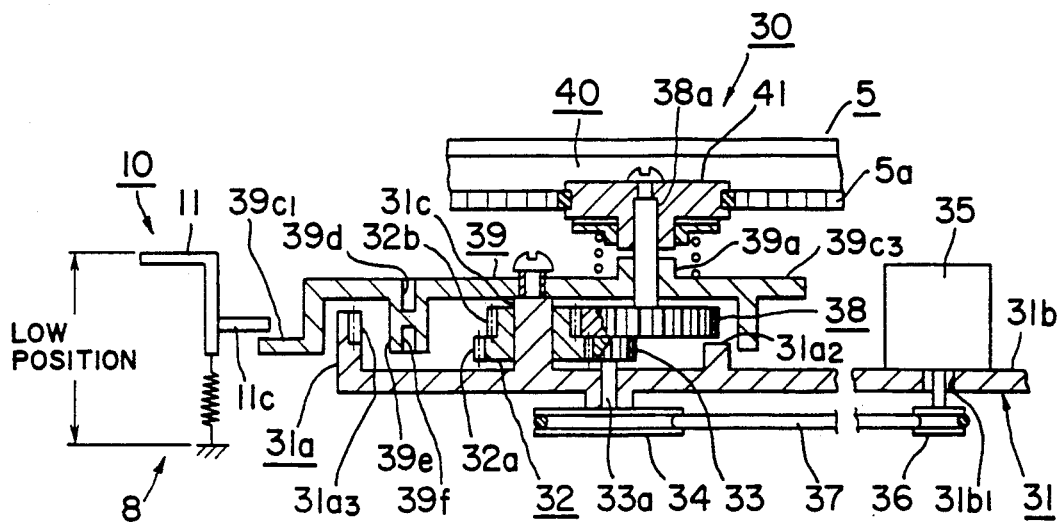
FIGS. 4A and 4B are views for explaining raised and fallen state of the disk recording/reproducing unit serving as the essential part of this invention.
Figure 4B:
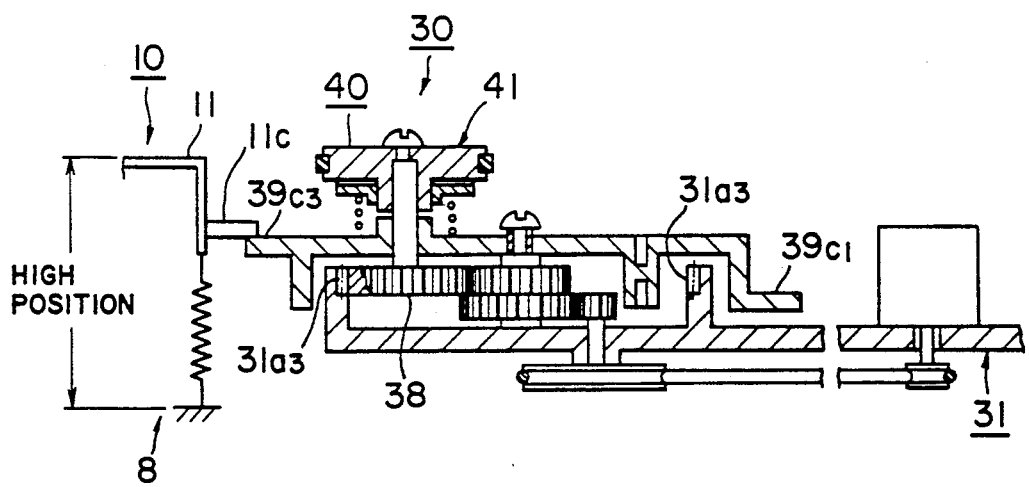
Figure 5:
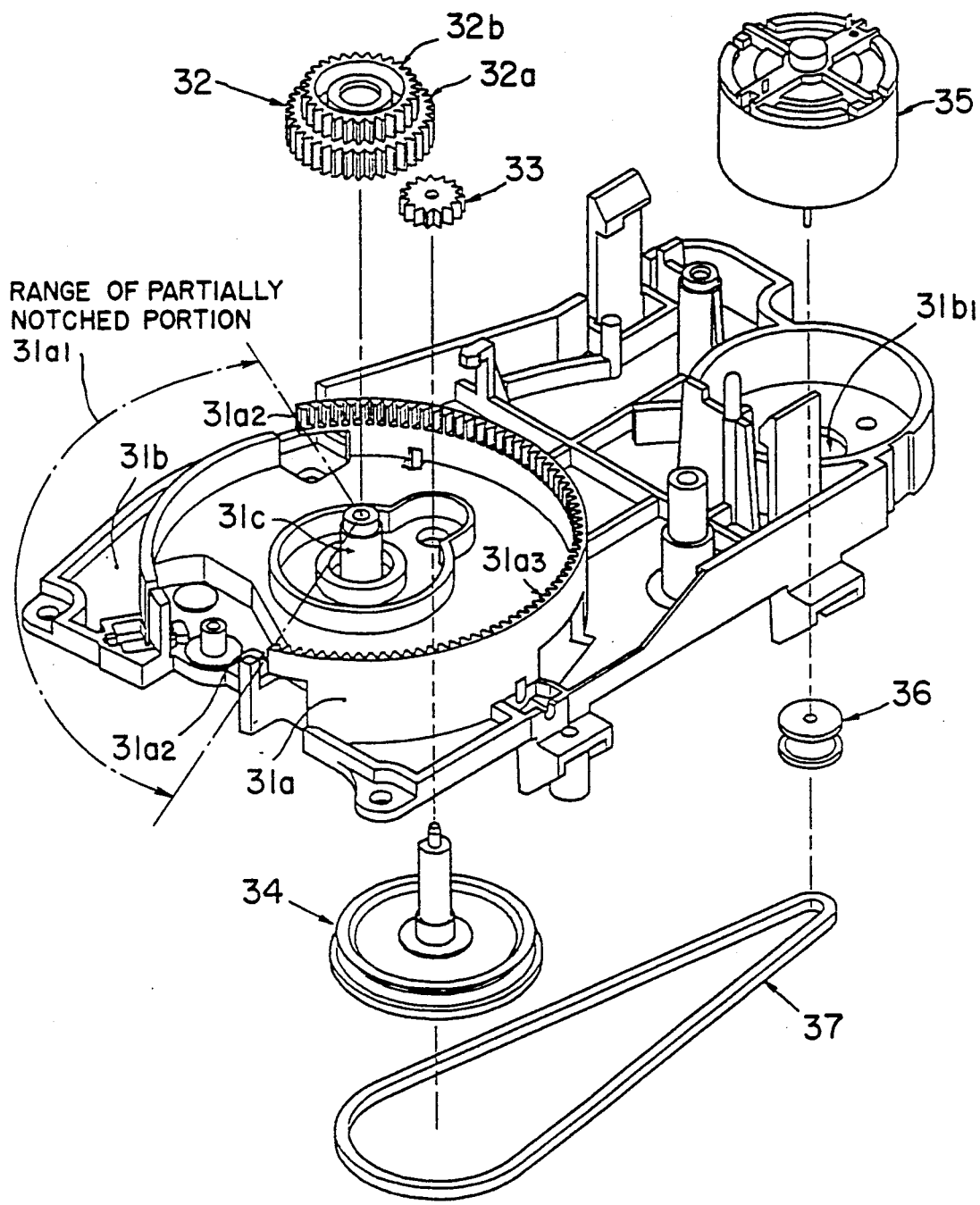
FIG. 5 is a perspective view showing the loading base of FIG. 3.
Figure 6:
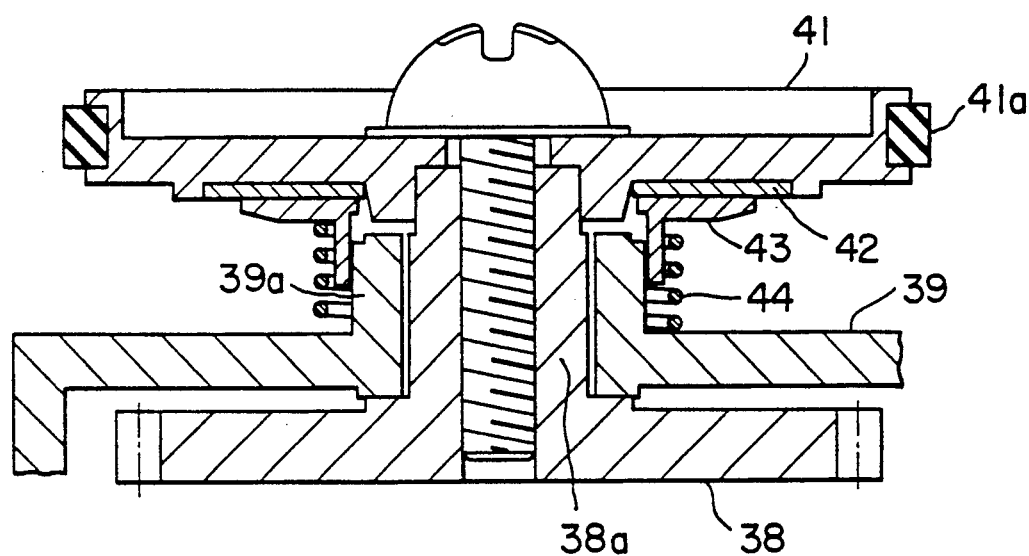
FIG. 6 is a longitudinal cross sectional view showing the clutch section of FIG. 3 in an enlarged manner.
Figure 7A:
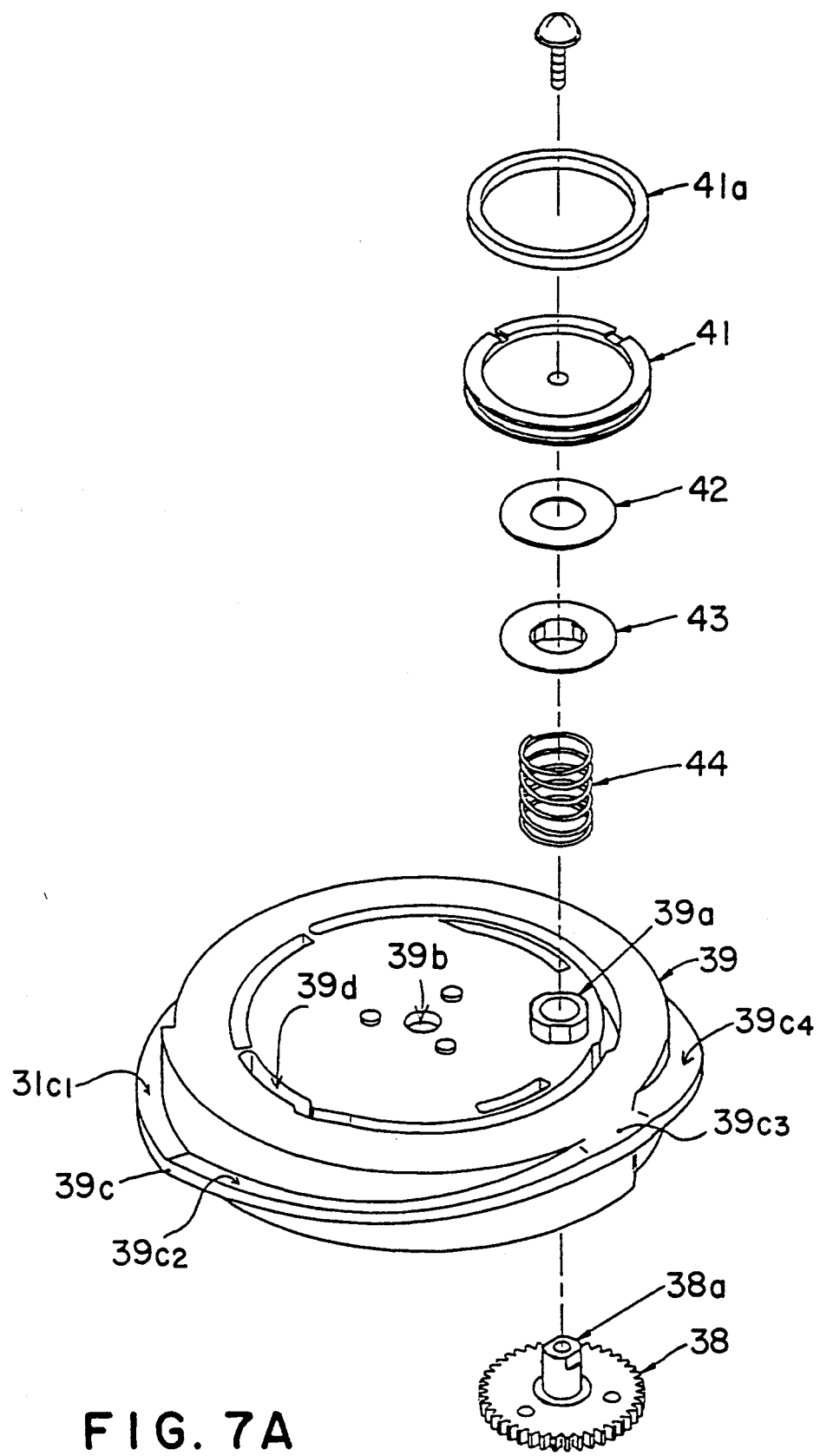
FIGS. 7A and 7B are perspective views for explaining the cam wheel of FIG. 3, viewed from upper side and lower side, respectively.
Figure 7B:
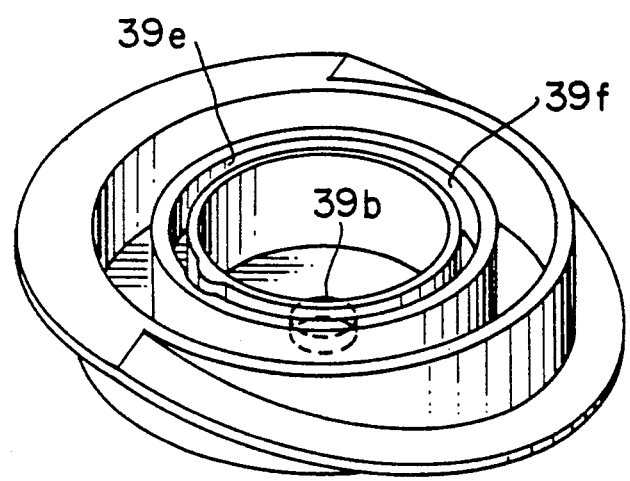
Figure 8:
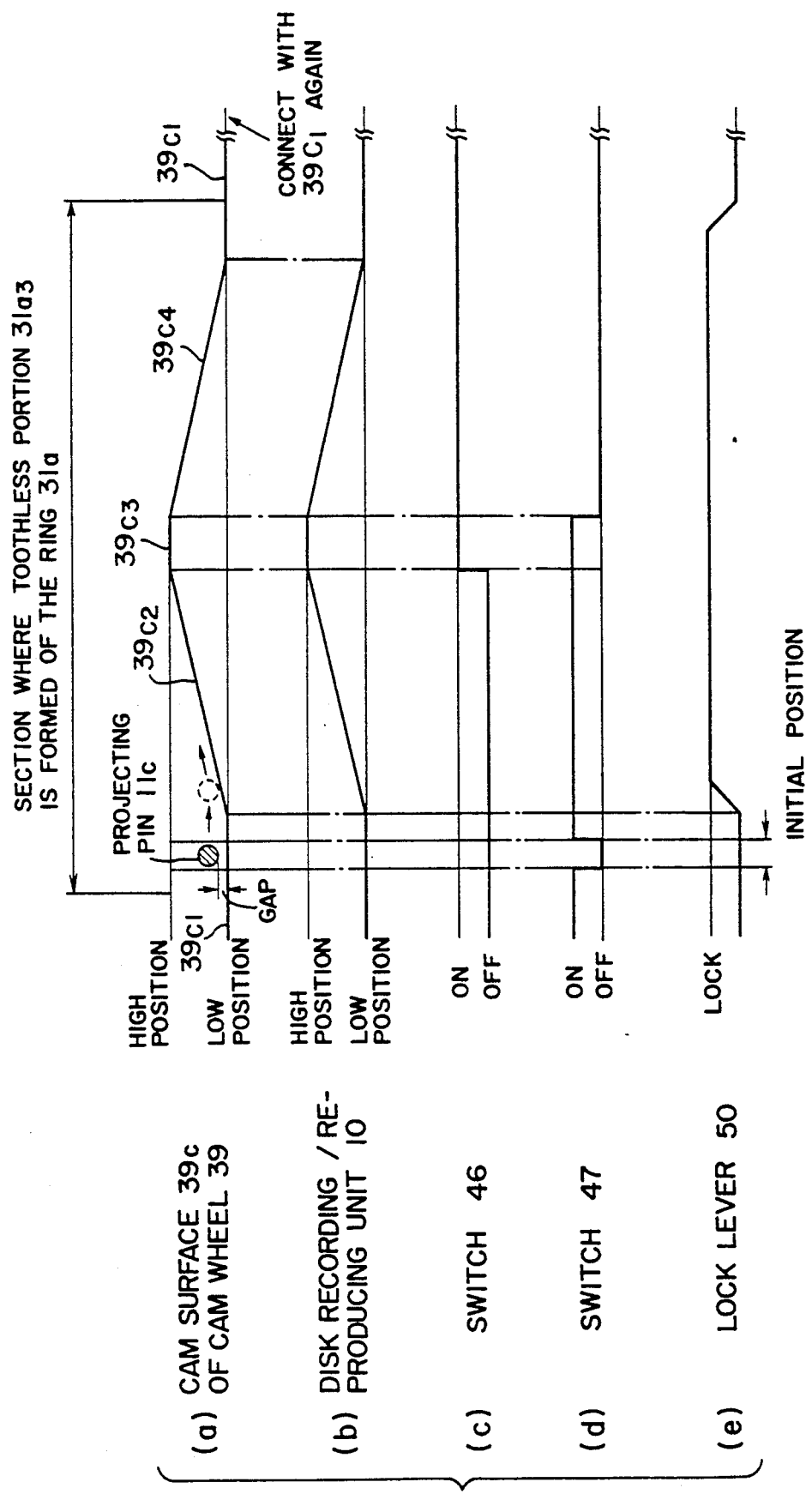
FIGS. 8A and 8B are views showing the operations of the respective parts corresponding to the vertically changing cam diagram of the cam wheel.
Figure 9A:
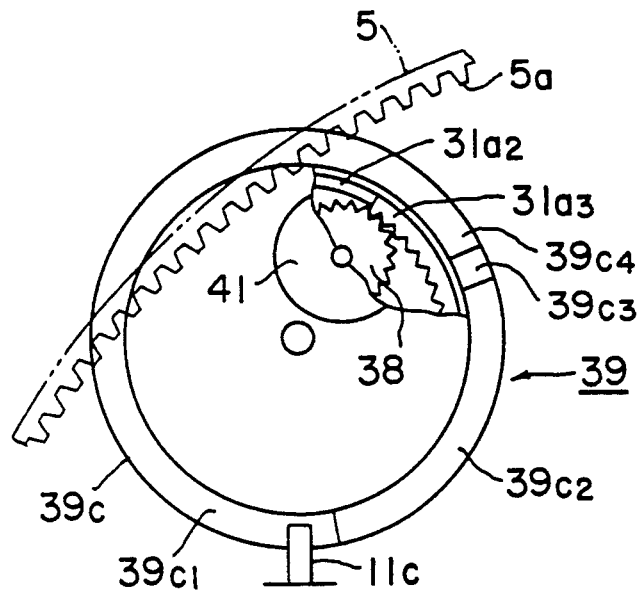
FIGS. 9A to 9I, FIGS. 10 and 11 are views for explaining the operations of the disk recording/reproducing unit and the loading mechanism unit.
Figure 9B:
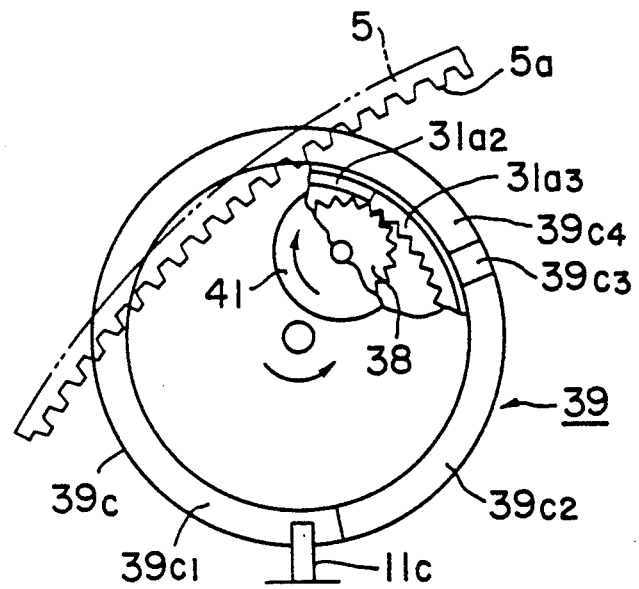
Figure 9C:
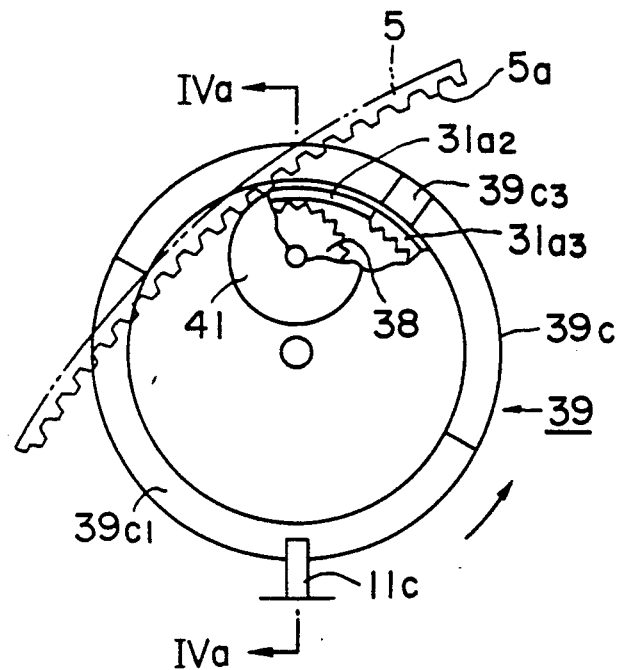
Figure 9D:
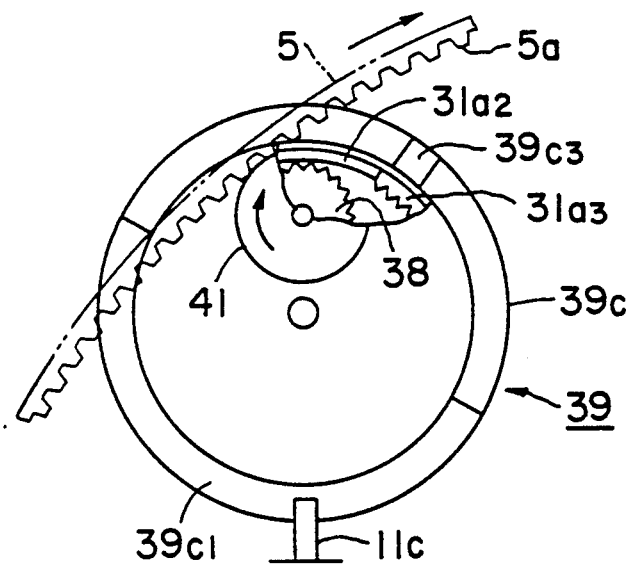
Figure 10:
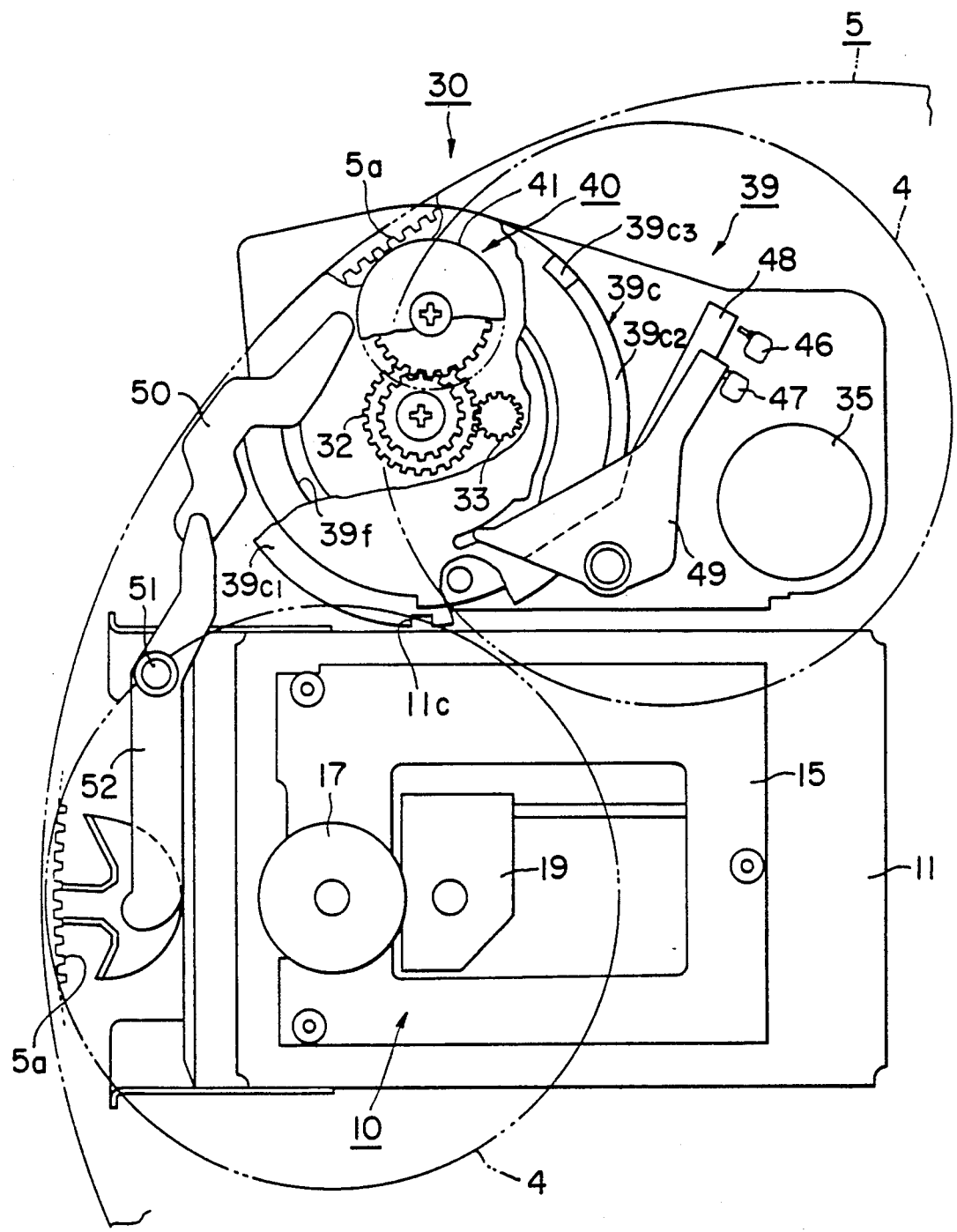
Figure 11:
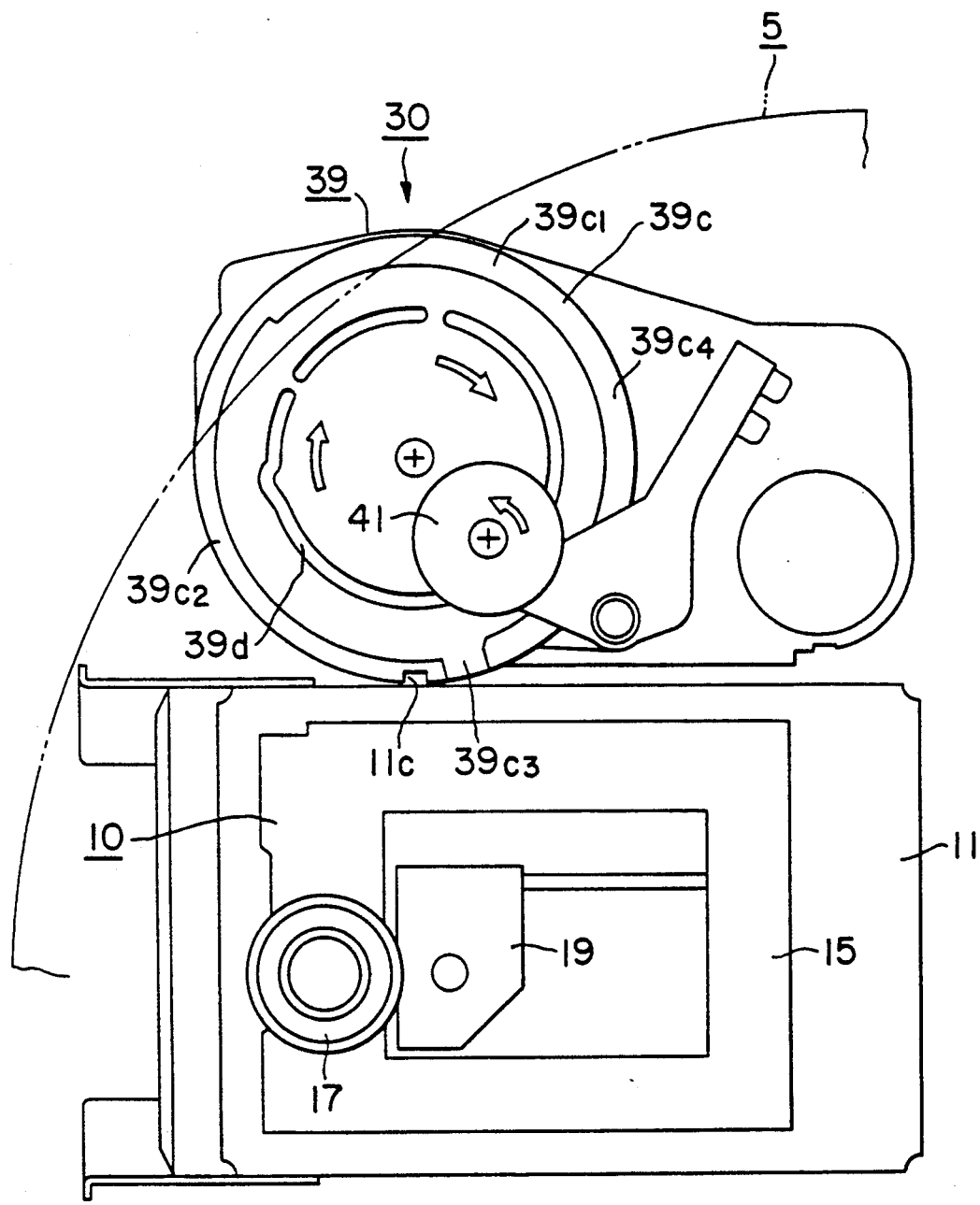

FIG. 2 is a perspective view showing the appearance of a multi-loaded disk drive arrangement according to this invention, FIG. 3 is a perspective view showing the disk recording/reproducing unit and the loading mechanism which serve as the essential part of this invention, FIGS. 4A and 4B are views for explaining the raised and fallen states of the disk recording/reproducing unit serving as the essential part of this invention, FIG. 5 is a perspective view showing the loading base of FIG. 3, FIG. 6 is a longitudinal cross sectional view showing the clutch section, FIGS. 7A and 7B are perspective views for explaining the cam wheel of FIG. 3, FIGS. 8a to 8e is a view showing the operation of respective portions corresponding to the vertically changing cam diagram of the cam wheel, FIGS. 9A to 9D are views showing a cam mode at the time of the loading operation, and FIGS. 10 and 11 are views for explaining the operations of the disk recording/reproducing unit and the loading mechanism unit.

Configuration of the appearance

In FIG. 2, a multi-loaded disk drive arrangement 1 according to this invention is of a structure in which an opening and closing cover 3 is hinged on one end portion of the upper surface portion 2a of a casing 2 so that it can be opened and closed. In order to observe or see through from the above disks 4 loaded within the disk drive arrangement 1, a substantially transparent circular window portion 3a is formed in the opening and closing cover 3.

On the front surface 2b of the casing 2, a control section for controlling this disk drive arrangement 1 is arranged.

A circular opening 2c is formed in the upper surface portion 2a of the casing 2. Within a space of the casing 2 opened through the circular opening portion 2c, a disk table 5 in the form of disk on which a plurality of disks 4 are loaded is arranged so that it is rotatable about the shaft 6 by drive means of a loading mechanism unit 30 (see FIG. 3) which will be described later.

Further, the disk table 5 includes an inner tooth gear portion 5a formed over the entire circumference inside the outer circumference of the disk table 5 as indicated by the partial cross sectional portion at the left and lower portion of the figure. An idler 41 (see FIG. 3) on which a friction member sticks can come into contact with the inner tooth gear portion 5a in a manner that it does not slip thereon, and can be away from the inner tooth gear 5a. It is to be noted that, without forming the inner tooth gear portion 5a, the inside portion of the outer circumference of the disk table 5 may be formed with a friction member, e.g., rubber, etc. to allow the idler 41 to come into contact therewith, and the outer circumferential portion of the idler 41 adapted to come in contact with the inner tooth gear portion 5a may be of a gear structure.

The disk table 5 is of a structure such that, when the idler 41 comes into contact with the inner tooth gear portion 5a, it can be rotated in both a clockwise direction (the direction indicated by the arrow A1) and a counterclockwise direction (the direction indicated by the arrow A2).

On the upper surface of the disk table 5, disk mount portions 5A to 5E for mounting thereon disks 4 equidistantly over the same circumference are formed. These disk mount portions 5A to 5E are in the form of double circular depressed portion, having an outside diameter slightly larger than that of the disk 4 to be mounted. From a practical point of view, they are formed so that disks 4 of two kinds of outside diameters, e.g., the outside diameter of 8 cm (5D1 in the figure) and the outside diameter of 12 cm (5D2 in the figure) can be mounted thereon. It is to be noted that the shape of the disk mount portions 5A to 5E is not limited to the above-mentioned shape.

Further, five semi-elliptic opening portions 5b are formed from the central portions of the disk mount portions 5A to 5E toward the shaft 6, respectively. An optical pick-up 19 (see FIG. 3) of the disk recording/reproducing unit 10 is movably provided within these semi-elliptic opening portions 5b.

Below the disk table 5, the previously described shaft 6 serving as center of rotation of the disk table 5 is fixed on a chassis 8 (partly shown at the lower part of the semi-elliptic opening portion 5b). A hole 8a adapted so that finger can be inserted thereinto is opened at the position corresponding to a center hole of a disk 4 mounted on the chassis 8 below the semi-elliptic opening portion 5b. Further, three depressed portions 5C1 adapted so that finger can be inserted thereinto are formed every disk mount portions 5A to 5E as shown in a manner close to the outer circumferences of the disk mount portions 5A to 5E, respectively. Thus, by putting inside periphery of the center hole and the outside periphery of the disk 4 between two fingers to insert two fingers between which the disk 4 is put into the hole 8a and the depressed portion 5C1, disks 4 can be easily loaded on the disk mount portions. Similarly, by performing a reverse operation, unloading can be also easily conducted.

Disk position Nos. PR1 to PR5 are set in advance in correspondence with disk mount sections 5A to 5E, respectively. These disk mount sections 5A to 5E are of a structure such that only the position of PR1 in the figure is the recording/reproducing position, and other positions PR2 to PR5 are positions where recording/reproducing is unable to be conducted. Namely, at a predetermined position (only the position of PR1 in the figure) below the disk table 5, disk recording/reproducing unit 10 (see FIG. 3) which will be described later is arranged. Accordingly, disks 4 mounted at other positions PR2 to PR5 are in the state waiting for selection of disk. When a desired disk position No. is inputted, the position of a desired disk 4 is detected by disk position sensor (not shown). Then, the recording/reproducing position PR1 and the position of the desired disk 4 are compared with each other. As a result, the direction of rotation of the disk table 5 is selected so that the desired disk 4 reaches the recording/reproducing position PR1 in the shortest time. For example, when the disk position PR5 in the figure is inputted, the disk table 5 is rotated in the direction indicated by an arrow A1. Further, when the disk position PR2 in the figure is inputted, the disk table 5 is rotated in the direction indicated by an arrow A2.

Furthermore, a cover 7 consisting of a circular section and a semi-elliptic section integrally formed with each other is provided at the recording/reproducing position PR1 in the figure. This cover 7 serves to protect the disk recording/reproducing unit 10. In addition, a disk clamp mechanism (not shown) is provided below the cover 7.

Disk Recording/Reproducing unit 10

As shown in FIG. 3, the disk recording/reproducing unit 10 has a function to record information signals onto a disk 4 (FIG. 2) by means of an optical head 19, and to reproduce recorded information signals on the disk 4. In FIG. 3, the earth symbol in the figure symbolically represents the state where the disk recording/reproducing unit 10 is fixed on the chassis below the disk table 5 of FIG. 2.

In the figure, a bracket 11 of the disk recording/reproducing unit 10 is box-shaped. Projecting pins 11a and 11b integrally formed with the bracket 11 are axially fitted into holes formed in a pair of pieces raised after cutting formed at the rear sides thereof on the chassis 8 (FIG. 2). Accordingly, the rear side of the bracket 11 is rotatably supported in a manner that the positions of the projecting pins 11a and 11a serving as a fulcrum of rotation are unchanged.

On the other hand, a link lever 12 is rotatably supported on the front side of the chassis 8. More particularly, the link lever 12 comprises a pair of side members positioned on the left and right sides and a connecting portion 12c connecting the side members. These side members are provided at one end thereof with projecting pins 12a and 12a adapted to be axially fitted into holes of pieces raised after cutting 8c and 8c formed on the chassis 8 (FIG. 2), and at the other ends thereof Y-shaped portions 12b and 12b, respectively. Further, the Y-shaped portions 12b and 12b are engaged with projecting pins 11b and 11b of the bracket 11, respectively. Accordingly, in accordance with the structure, the positions of the projecting pins 11b and 11b can be vertically changed. The front side of the bracket 11 is supported so that it can be rotationally moved in upper and lower directions (the directions indicated by an arrow) to more degree than the rear side of the bracket.

Between the left and right side surfaces of the bracket 11 and the chassis 8, a pair of tensile springs 13 and 13 are stretched. The bracket 11 is biased always toward the chassis 8 located below.

Further, a slide contact portion 11c (hereinafter referred to as a projecting pin 11c) of the disk recording/reproducing unit 10 serving as the essential part of this invention is provided on the right side surface of the bracket 11. This projecting pin 11c is slidably in contact with a cam surface 39c for raising and falling the disk recording/reproducing unit, formed on a cam wheel 39 of a loading mechanism unit 30 which will be described later. By the operation of the loading mechanism unit 30, the disk recording/reproducing unit can be vertically moved between at a high position of the cam surface 39c and at a low position thereof. Namely, with the projecting pins 11a and 11a on the rear side being as a center of rotation, in dependency upon how the projecting pin 11c is in contact with the cam surface 39c, the position of the projectingn pins 11b and 11b on the fron side of the bracket 11 is rotated upwardly and downwardly (the direction indicated by an arrow). Accordingly, the front end side of the bracket 11 is located at the low position shown in FIG. 4A (cam surface 39C1) or at the high position shown in FIG. 4B (cam surface 39c3) when the chassis 8 is taken as a reference in dependency the state of the slide contact with the cam surface 39c. When the front end side of the bracket 11 is located at the high position, the projecting pin 11c is in contact with the higher cam surface 39c3. For this reason, the front end side of the bracket 11 is flush with the rear end side thereof, and is in parallel to the chassis 8. Thus, the recording/reproducing unit 10 is brought into a recordable/reproducible state.

On the other hand, when the front end side of the bracket 11 is located at the low position, the front end side of the bracket 11 is in contact with the chassis 8. For this reason, the projecting pin 11c of the bracket 11 is not directly in contact with the low cam surface 39c1.

As a result, a gap of about 1 mm is formed as shown in FIG. 4A. When the front end side of the bracket 11 is located at the low position as stated above, the rotational operation of the disk table 5 which will be described later is able to be carried out.

Turning back to FIG. 3, above the bracket 11, a reproducing base 15 is fixed through a rubber damper 14 for vibration proof. A motor 16 is fixed on the reproducing base 15. A turn table 17 and a spindle 18 are secured to the shaft of the motor 16. The center hole of the disk 4 is fitted over the spindle 18. Thus, the disk 4 is mounted on the turn table 17. When the disk recording/reproducing unit 10 is supported so that it is in a recordable/reproducible state, a disk 4 is mounted on the turn table 17 at a position slightly higher than the mount surface of the disk table 5. Further, the disk 4 is clamped by means of a clamper (not shown) and the optical head 19 slides in a direction indicated by an arrow on a guide rail 20 below the disk 4. Thus, the disk recording/reproducing unit 10 is ready to be in a recordable/reproducible state.

Loading Mechanism Unit 30

The loading mechanism unit 30 serving as the essential part of this invention will now be described with reference to FIGS. 3 to 8.

In FIGS. 3, 4A and 4B, the loading mechanism unit 30 is arranged on the right side of the previously described disk recording/reproducing unit 10. This loading mechanism unit 30 is such that a loading mechanism for rotating a desired disk 4 on the disk table 5 in a clockwise direction or in a counterclockwise direction so that it is located at a predetermined recording/reproducing position, and a movement (rotating) mechanism for vertically moving the disk recording/reproducing unit 10 are constituted in one body. This loading mechanism unit 30 includes a single drive source and a clutch section 40. Further, the loading mechanism 30 is of a unit structure for facilitating assembling and maintenance service, etc.

As shown in FIG. 5, the loading base 31 of the loading mechanism unit 30 is integrally molded by resin. The loading base 31 includes a circular ring 31a and a flat surface 31b contigurous to the ring 31a. Further, the ring 31a of the loading base 31 includes a partially notched portion 31a1, a toothless portion 31a2 and a toothed gear 31a3 formed along the circumference of the ring 31a. The toothed portion 31a3 is in the form of the inner tooth gear along the inner circumference of the ring 31a. In addition, a stud 31c is formed at the central portion of the ring 31a.

Turning back to FIGS. 3, 4A and 4B, a first gear 32 comprised of vertically arranged double gears 32a and 32b coaxially integrally formed by resin is rotatably axially secured through the stud 31. A second gear 33 is meshed with the lower gear 32a of the first gear 32. This second gear 33 is connected to a drive source. Namely, a motor 35 is fixed with a hole 31b1 of the flat surface 31b being as a center. A rectangular belt 37 of rubber is stretched between a V-pulley 36 fixed on the front shaft of the motor 35 and the shaft 33a of the second gear 33. The motor 35 serves as a single drive source for the loading mechanism unit 30. The rotation of the motor 35 is decelerated in order of the above-mentioned components, and is transmitted to the upper gear 32b of the first gear 32 serving as the gear of the final stage of the reduction mechanism. A planetary gear 38 connected to an idler 41 through a clutch section 40 which will be described later is meshed with the gear 32b of the final stage of the reduction mechanism. It is to be noted that the reduction mechanism connected to the drive source is not limited, but any reduction mechanism provided with a gear structure at the final stage may be employed.

The planetary gear 38 having a stud portion 38a is meshed with the upper gear 32b of the first gear 32. Further, this planetary gear 38 can be meshed with the previously described toothed gear 31a3 of the ring 31a. The planetary gear 38 revolves round along the toothed portion 31a3 of the ring 31a while revolving on its axis, and when the planetary gear 38 reaches the partially notched portion 31a1 or the toothless portion 31a2, it rotates in accordance the clutch operation at the time of the loading operation which will be described later.

A cam wheel 39 integrally molded by resin is axially secured so that it is rotatable about the stud 31c (FIG. 4A). Further, the stud portion 38a of the planetary gear 38 is axially secured on the bearing portion 39 formed spaced from the center of the cam wheel 39. A clutch section 40 is attached to the stud portion 38a of the planetary gear 38 projected upwardly of the cam wheel 39.

In the clutch portion 40, as shown in FIG. 6, a ring-shaped friction member 42 such as felt etc., a sleeve 43 and a compression spring 44 are fitted into the bearing portion 39a of the cam wheel 39 in order recited below the idler 41 over which friction member 41a such as rubber, etc. is fitted, and are fixed on the stud portion 38a by means of a screw 45 from the upper part of the idler 41.

By the above-mentioned configuration of the clutch section 40, the idler 41 and the planetary gear 38 can be rotated in one body by the friction force of the friction member 42 and the compressive force of the compression spring 44 while producing a friction force between these members and the cam wheel 39. Further, in dependency upon the clutch operation at the time of the loading operation which will be described later, there exist the state where the idler 41 and the cam wheel 39 are rotated in one body, the state where only the idler 41 is rotated and the cam wheel 39 is stopped, and the state where both the idler 41 and the cam wheel 39 are rotated.

Further, the idler 41 of the clutch section 40 can come into contact with the inner tooth gear portion 5a formed on the previously described disk table 5 or can be away therefrom by the loading operation which will be described later.

As shown in FIGS. 7A and 7B, the above-mentioned cam wheel 39 is of a cylindrical structure integrally molded by resin. On the upper surface side of the cam wheel 39, the previously described bearing portion 39a and the hole 39b serving as center of rotation are formed, and four kinds of cam surfaces 39c, 39d, 39e and 39f are formed.

Namely, the first cam surface 39c is a disk recording/reproducing unit vertically moving cam with which the projecting pin 11c of the previously described disk recording/reproducing unit 10 is slidably in contact, and functioning to vertically move the disk recording/reproducing unit 10. This cam surface 39c is in the form of flange along the outer periphery of the cam wheel 39. The detail of the above-mentioned cam surface 39c is as follows. Between the cam surface 39c1 at the lower position and the cam surface 39c3 at the higher position, tapered cam surfaces 39c2 and 39c4 are formed. The cam surface 39c3 at the higher position serves to allow the disk recording/reproducing unit 10 to be in a recordable/reproducible state, and the cam surface 39c1 at the lower position serves to allow the disk table 5 to be in a rotatable state in a clockwise or counterclockwise direction.

The second cam surface 39d and the third cam surface 39e are cams for detecting the cam mode. The state of this cam mode is as shown in FIGS. 8(c) and 8(d) in correspondence with FIG. 8(a). The above-mentioned cam surface 39d is formed on the upper surface of the cam wheel 39. On the other hand, the cam surface 39e is formed on the internal surface side of the cam wheel 39. Switch levers 48 and 49 in contact with the cam mode detectors (hereinafter referred to as switches 46 and 47) shown in FIG. 3 are slidably in contact with the cam surfaces 39d and 39e, respectively. The cam mode is detected by the switches 46 and 47 to control the motor 35 (FIG. 3) serving as a drive source by control means (not shown). In place of the switch 46 or 47, a photo sensor, etc. may be used.

The fourth cam surface 39f serves as a cam to securely fix the disk table 5 before the disk recording/reproducing unit 10 is raised in the loading operation which will be described later. Accordingly, the disks table 5 is securely fixed in the recordable/reproducible state by the action of the fourth cam surface 39f. This cam surface 39f is formed on the internal surface side of the cam wheel 39. The lock lever 50 (FIG. 3) is slidably in contact with the cam surface 39f. The state of this cam mode is as shown in FIG. 8(e) in correspondence with FIG. 8(a).

Operation of the loading mechanism 30

The operation of the laoding mechanism unit 30 will now be described with reference to FIG. 3, 4, 6 and 9 to 11.

A plurality of disks 4 are mounted in advance on the disk table 5 within the disk drive 1. Respective components in the disk drive 1 are set so that they take an initial position shown in FIG. 9A.

Namely, at the initial position shown in FIG. 9A, the idler 41 of the loading mechanism unit 30 is away from the inner tooth gear portion 5 of the disk table 5, the planetary gear 38 integrated with the idler 41 is meshed with the toothed gear portion 31a3 of the ring 31a near the toothless portion 31a2, and the disk recording/reproducing unit 10 is in a fallen state. Accordingly, the projecting pin 11c of the disk recording/reproducing unit 10 is placed at the position of the lower cam surface 39c1 of the cam wheel 39.

From the above-mentioned initial state, the operation of the loading mechanism 30 shifts to the disk selecting operation. In the mode of the disk selecting operation, as previously described, the direction of rotation of the disk table 5 is selected so that the disk 4 reaches the recording/reproducing position PR1 (FIG. 2) in the shortest time. The operation in the case of rotating, e.g., the disk table 5 in a clockwise direction to move a desired disk 4 up to the recording/reproducing position PR1 is described below.

Namely, the motor 35 is rotated so as to rotate the idler 41 from the initial state in a clockwise direction, as shown in FIG. 9B. At this time, since the planetary gear 38 in one body with the idler 41 is meshed with the toothed gear portion 31a3 of the ring 31a, it revolves the cam wheel therearound in a counterclockwise direction while revolving on its axis in a clockwise direction.

When the planetary gear 38 is passed through the toothed portion 31a3 of the ring 31a to enter the toothless portion 31a2 of the ring 31a, the planetary gear 38 in one body with the idler 41 stops revolution on its axis by the weight of the friction member 42 of the clutch section 40 and the compression spring 44. As a result, the cam wheel 39 only revolves round in a counterclockwise direction. Thus, the idler 41 comes into contact with the inner tooth gear portion 5a of the disk table 5, as shown in FIG. 9C. It is to be noted that, as previously described, the projecting pin 11c of the disk recording/reproducing unit 10 is not directly in contact with the lower cam surface 39c1, but there is a gap of about 1 mm (FIG. 4A). Accordingly, in allowing the idler 41 to come into contact with the inner tooth gear portion 5a of the disk table 5, load of the disk recording/reproducing unit 10 is not applied to the cam wheel 39. Thus, the cam wheel 39 can lightly revolve round in a counterclockwise direction.

When the idler 41 comes into contact with the inner tooth gear portion 5a of the disk table 5, revolution in a counterclockwise direction of the cam wheel 39 is stopped, as shown in FIG. 9D. Since the torque of the motor 35 is stronger than the friction force of the clutch portion 40, the planetary gear 38 in one body with the idler 41 begins rotating in a clockwise direction. At this time, since a force of rotation is exerted on the cam wheel 39 in a counterclockwise direction at all times by the friction force of the friction member 42 of the clutch section 40 and the compressive force of the compression spring 44, the disk table 5 rotates in a clockwise direction without slip. Thus, a desired disk 4 reaches the recording/reproducing position PR1.

Figure 9E:
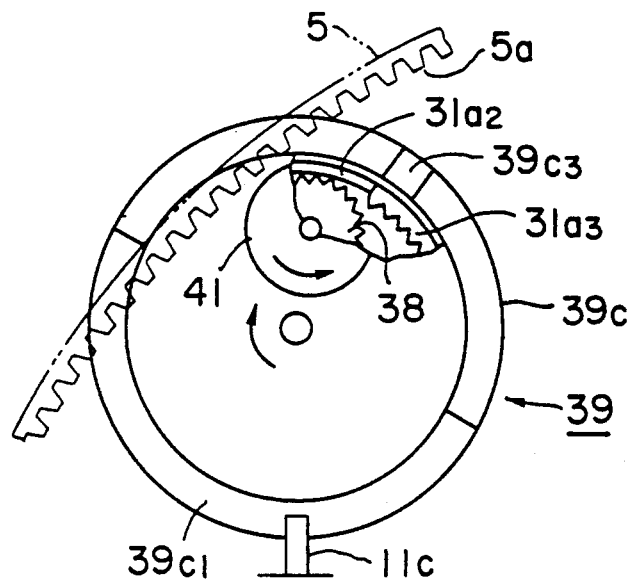
Figure 9F:
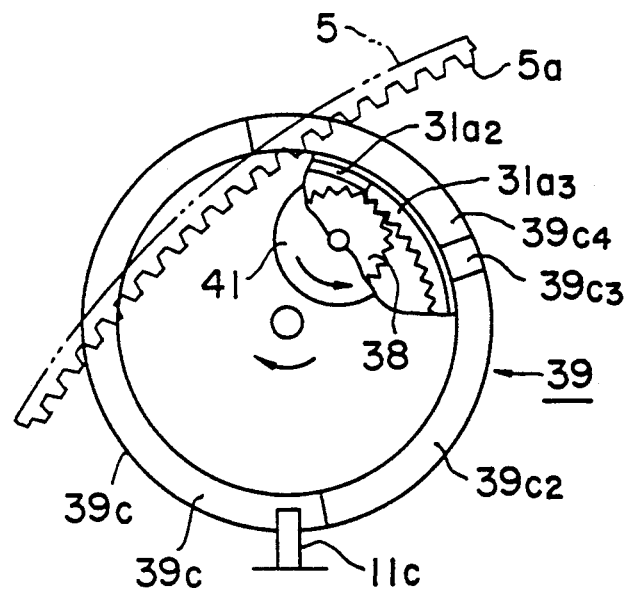

Here, after it is confirmed that the desired disk 4 has reached the recording/reproducing position PR1 by means (not shown), the motor 35 is rotated so that the idler 41 rotates in turn in a counterclockwise direction, as shown in FIG. 9E. When the idler 41 rotates in a counterclockwise direction, the idler 41 escapes from the inner tooth gear portion 51a, and is away therefrom. At this time, the cam wheel 39 rotates in a clockwise direction, so the planetary gear 38 in one body with the idler 41 moves from the position of the toothless portion 31a2 to mesh with the toothed gear portion 31a3, as shown in FIG. 9F. In this state, the disk recording/reproducing unit 10 is still being fallen, and the lock lever 50 slidably in contact with the cam surface 39f locks the disk table 5. Namely, as shown at the light and lower part of FIG. 10, a lever 52 rotating about a shaft 51 is connected to the end portion opposite to the side slidably in contact with the cam surface 39f of the lock lever 50. One end of this lever 52 comes into contact with the inner tooth gear portion 5a of the disk table 5 as shown. As a result, the disk table 5 is locked.

Figure 9G:
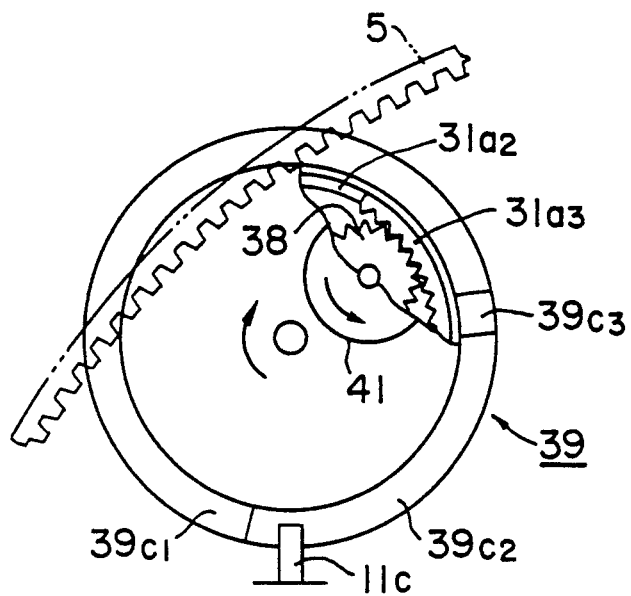
Figure 9H:
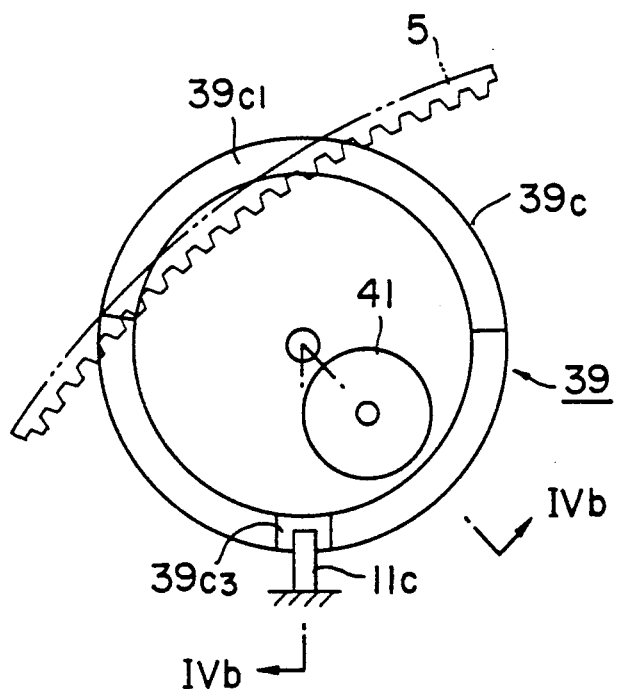
Figure 9I:
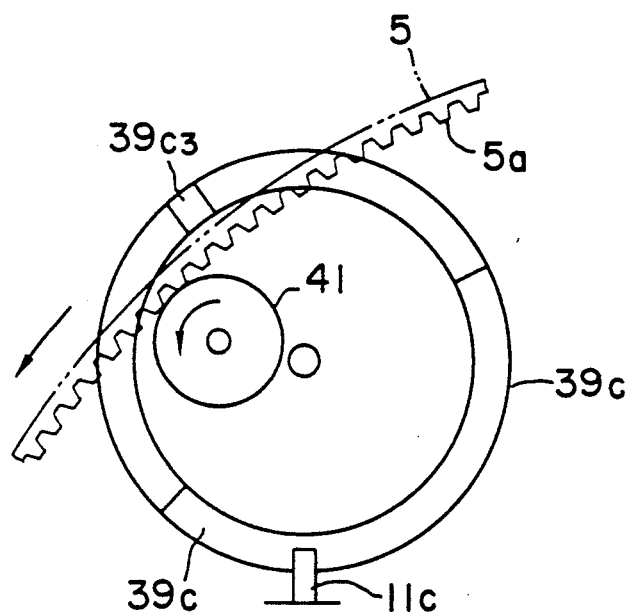

Further, as shown in FIGS. 9G and 11, when the idler 41 continues to rotate in a counterclockwise direction, the planetary gear 38 in one body with the idler 41 revolves round along the toothed gear 31a3 while revolving on its axis. Moreover, since the cam wheel 39 also rotates in a clockwise direction, the projecting pin 11c of the disk recording/reproducing unit 10 is passed through the tapered cam surface 39c2 from the cam surface 39c1 at the low position, and slidably moves up to the position of the higher cam surface 39c3, as shown in FIGS. 4B and 9H.

When the projecting pin 11c of the disk recording/reproducing unit 10 reaches the higher cam surface 39c3, as shown in the previously described FIG. 4B, the disk recording/reproducing unit 10 is brought into a recordable/reproducible state. At this position, the motor 35 is stopped. Thereafter, the desired disk 4 is subjected to recording/reproducing by the disk recording/reproducing unit 10.

The recording/reproducing operation is thus completed. Thereafter, a required disk selecting operation may be carried out, or all the operation is completed.

In the disk selecting operation, in the case of rotating the disk table 5 in a counterclockwise direction, the position where the idler 41 comes into contact with the inner tooth gear portion 5a is different from that in the case of rotating the disk table 5 in a clockwise direction. In this case, the disk table 5 is rotated in a counterclockwise direction so as to move it from the initial state of FIG. 9A to the position shown in FIG. 9I.

Namely, the cam wheel 39 of the disk table 5 is rotated in a clockwise direction. Accordingly, the projecting pin 11c of the disk recording/reproducing unit 10 is passed through the cam surface 39c1 at the low position, the tapered cam surface 39c2, the cam surface 39c3 at the high position, and the tapered cam surface 39c4 to come into contact with the inner tooth gear portion 5a at the position of the lower cam surface 39c1. When the projecting pin 11c is located at the position of the lower cam surface 39c1, the planetary gear 38 in one body with the idler 41 is located at the position of the previously described tooth missing partially notched portion 31a1. Accordingly, the idler 41 position serves as the position where the disk table 5 is rotated in a counterclockwise direction. At this position, the idler 41 is rotated in a counterclockwise direction to rotate the disk table 5 in a counterclockwise direction. Thereafter, the operation based on rotation in a counterclockwise direction of the disk table 5 will be conducted, but the description thereof is omitted here.

We claim:

1. A multi-loaded disk drive arrangement comprising a disk table, a plurality of disks mounted on the same circumference on said disk table, a loading mechanism for rotating a desired disk on said disk table in a clockwise direction or in a counterclockwise direction so that it is located at a predetermined recording/reproducing position, and a movement mechanism for moving a disk recording/reproducing unit including an optical pick-up arranged at a predetermined positioned below said disk table so that it is placed in a recordable/reproducible state, said loading mechanism and said movement mechanism being connected through a single drive source and a reduction mechanism having a final stage, said arrangement comprising an idler connected through a clutch mechanism to a planetary gear rotating between a gear of the final stage of said reduction mechanism and an annular toothed gear having a toothless portion, and a cam wheel rotatably connected through said clutch mechanism to said idler, and including a disk recording/reproducing unit vertically moving cam for moving said disk record/reproducing unit;

so that when said idler is located at the position of said toothless portion, said drive source is driven to thereby allow said idler to come into contact with said disk table for rotating said disk table in a clockwise direction or in a counterclockwise direction, and when said idler is meshed with said toothed gear, said cam wheel connected to said idler is driven to move said disk recording/reproducing unit so that it is located at a recording/reproducing position, and to stop said drive source.

2. A multi-loaded disk drive arrangement as set forth in claim 1, wherein said cam wheel comprises a cam mode detecting cam for operating a mode detector for controlling said drive source, and a lock cam for locking said disk table when said disk recording/reproducing unit is in a recordable/reproducible state.

3. A multi-loaded disk drive arrangement comprising:
a rotatable disk table for holding a plurality of disks arranged on the same circumference thereof;
a loading mechanism for rotating a desired disk on said table so that it is placed at a predetermined recording/reproducing position, and including a loading base comprising a flat surface and ring portion having an annular toothed gear portion and a toothless portion thereon;
a movement mechanism for moving a recording/reproducing unit including an optical head so that it is placed at a recordable/reproducible position below said table;
a single drive source electrically connecting said loading mechanism and said movement mechanism to drive both said mechanisms;
a reduction mechanism connecting said loading mechanism and said movement mechanism, and including gears of plurality of stages;
a cam wheel adapted to move said recording/reproducing unit upward and downward by a cam surface obliquely provided on the outer peripheral surface, a planetary gear rotating between a gear of the final stage of said reduction mechanism and said toothed gear of said loading mechanism being provided in association with said cam wheel; and
a clutch mechanism including an idler adapted to come into contact with an inner tooth gear formed on said disk table and rotate coaxially with said planetary gear, so that when said idler is located at the position of said toothless portion of said loading mechanism, said clutch mechanism helps to drive said drive source to thereby allow said idler to come into contact with said inner tooth gear to rotate said disk table in a clockwise direction or in a counterclockwise direction, while when said idler is meshed with said toothed gear, said clutch mechanism helps to drive said cam wheel connected to said idler to move said recording/reproducing unit up to a recording/reproducing position to stop said drive source.

4. A multi-loaded disk drive arrangement as set forth in claim 3, wherein said disk recording/reproducing unit comprises a bracket including a slide contact pin provided on one side surface thereof, said slide contact pin being adapted to come into slide contact with said cam wheel to adjust the position of said optical pick-up upward and downward, a pair of pieces raised after cutting for rotatably supporting the rear side of said bracket, a pair of link levers each including Y-shaped portions adapted to be fitted over projecting pins on both side surfaces adjacent the front side of said bracket, and a pair of pieces raised after cutting for rotatably holding said link levers.

5. A multi-loaded disk drive arrangement as set forth in claim 3, wherein said toothed gear portion and said toothless portion are formed at respective predetermined positions on said ring portion, said flat surface closes one end of said ring, said drive source comprises a motor supported on said flat surface, said cam wheel is attached on said loading base, said reduction mechanism is provided within said cam wheel, and said clutch mechanism is attached on said cam wheel.

6. A multi-loaded disk drive arrangement as set forth in claim 3, wherein said cam wheel comprises a substantially cylindrical body, an inclined cam surface integral with said body so as to project at a predetermined inclination toward the outer circumferential surface of said body, a bearing portion formed in a projected manner eccentrically from the center of rotation on the upper surface of said body, and a cam adapted to securely fix said disk table before said recording/reproducing unit is raised at the time of the loading operation.

7. A multi-loaded disk drive arrangement as set forth in claim 3, wherein said clutch mechanism comprises said idler including a friction member fitted over the outer circumferential surface thereof and a ring-shaped friction member fitted on the side of the lower surface thereof, said planetary gear being screwed on said idler through a bearing portion projected eccentrically toward the upper surface of said cam wheel, and a sleeve having a collar portion in contact with said ring-shaped friction member, said sleeve being adapted so that it is spring-biased from the upper surface of said cam wheel by a compression spring loosely fitted over the periphery of the tubular portion and urged against said idler.

* * * * *